United States Patent
Li (10) Patent No.: US 11,803,211 B2
(45) Date of Patent: Oct. 31, 2023

(54) DISPLAY DEVICE

(71) Applicant: Wuhan China Star Optoelectronics Semiconductor Display Technology Co., Ltd., Hubei (CN)

(72) Inventor: Wenqi Li, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 408 days.

(21) Appl. No.: 16/973,055

(22) PCT Filed: Sep. 17, 2020

(86) PCT No.: PCT/CN2020/115840
§ 371 (c)(1),
(2) Date: Dec. 8, 2020

(87) PCT Pub. No.: WO2022/041348
PCT Pub. Date: Mar. 3, 2022

(65) Prior Publication Data
US 2022/0317733 A1  Oct. 6, 2022

(30) Foreign Application Priority Data
Aug. 31, 2020  (CN) .......................... 202010894936.9

(51) Int. Cl.
*G06F 1/16* (2006.01)
*G09F 9/30* (2006.01)

(52) U.S. Cl.
CPC .......... *G06F 1/1652* (2013.01); *G06F 1/1641* (2013.01)

(58) Field of Classification Search
CPC .. G06F 1/1652; G06F 1/1641; G06F 345/905; G06F 345/214; G06F 345/901; G06F 345/169; G06F 348/115; G06F 348/158; G06F 160/133; G06F 160/24; G06F 160/135; G06F 361/749; G06F 248/917; G06F 455/566; G06F 345/156; G06F 359/461
See application file for complete search history.

(56) References Cited

U.S. PATENT DOCUMENTS

| 10,126,778 | B2 | 11/2018 | Yang | |
| 2014/0043577 | A1* | 2/2014 | Kim | ......................... H05K 1/11 |
| | | | | 174/254 |
| 2016/0161983 | A1 | 6/2016 | Lee et al. | |
| 2016/0349971 | A1* | 12/2016 | Chi | ......................... G09G 5/373 |

(Continued)

FOREIGN PATENT DOCUMENTS

| CN | 201188642 | 1/2009 |
| CN | 105518767 | 4/2016 |

(Continued)

*Primary Examiner* — Dedei K Hammond
*Assistant Examiner* — Martin Antonio Asmat Uceda (57) ABSTRACT

A display device is provided, including: a housing body, a first shaft, a first roller, a flexible display screen, a main board, and a flexible circuit board. When the display device is in use, the entire flexible display screen is stretched to an exterior of the housing body. When the display device is idle, the flexible display screen is rolled up to be spirally sleeved on the roller. Therefore, a size of the display device can be reduced, and portability of the display device is improved.

8 Claims, 6 Drawing Sheets

(56) References Cited

U.S. PATENT DOCUMENTS

| | | | | |
|---|---|---|---|---|
| 2017/0318693 A1* | 11/2017 | Kim | ...................... | H02K 11/21 |
| 2019/0204874 A1* | 7/2019 | Kim | ..................... | H10K 77/111 |
| 2019/0324501 A1* | 10/2019 | Kim | ..................... | H05K 5/0017 |

FOREIGN PATENT DOCUMENTS

| | | |
|---|---|---|
| CN | 106981254 | 7/2017 |
| CN | 107528945 | 12/2017 |
| CN | 207068366 | 3/2018 |
| CN | 108877532 | 11/2018 |
| CN | 109839993 | 6/2019 |
| CN | 110494909 | 11/2019 |
| CN | 110599911 | 12/2019 |
| CN | 111583790 | 8/2020 |
| CN | 111599278 | 8/2020 |

\* cited by examiner

DISPLAY DEVICE

RELATED APPLICATIONS

This application is a National Phase of PCT Patent Application No. PCT/CN2020/115840 having International filing date of Sep. 17, 2020, which claims the benefit of priority of Chinese Patent Application No. 202010894936.9 filed on Aug. 31, 2020. The contents of the above applications are all incorporated by reference as if fully set forth herein in their entirety.

FIELD AND BACKGROUND OF THE INVENTION

The present disclosure relates to the field of display technologies, and more particularly, relates to a display device.

Computer data may be displayed by display devices in forms of words, numerals, symbols, or intuitive images. Furthermore, by transmitting orders or data into hardware and software of computer systems with a keyboard, display contents may be added, deleted, or changed anytime. The display devices may be divided into a plasma type, a liquid crystal type, a light-emitting diode type, and a cathode ray type according to their luminescent principles.

As a vital display technology, flexible screens have been developed over the past few years. Compared with conventional screens, the flexible screens have significant merits such as thin and light body and low power consumption. In addition, due to bendability and flexibility of the flexible screens, application fields thereof have become increasingly wide.

Nowadays, electronic devices, e.g., cellphones and tablets, are widely used. Flat electronic devices can no longer satisfy people's requirements of space-saving and portable products because demands for electronic products are continuously raised following developments of technologies. As a result, it is necessary to provide a novel display device to address the above issue.

SUMMARY OF THE INVENTION

An aim of the present disclosure is to provide a display device that can solve a following problem: conventional devices are not portable because they occupy much space due to their large bodies.

To solve the above problem, the present disclosure provides a display device, including: a housing body; a first shaft, wherein the first shaft is rotatably mounted at two opposite inner sidewalls of the housing body; a first roller, wherein the first roller is sleeved on an exterior of the first shaft and is firmly connected to the first shaft; a flexible display screen, wherein the flexible display screen is spirally sleeved on an outer surface of the first roller, an end of the flexible display screen is connected to the first roller, and another end of the flexible display screen is connected to an exterior of the housing body; a main board, wherein the main board is attached to an interior of the first roller or the exterior of the housing body; and a flexible circuit board, wherein the flexible circuit board is connected to the end of the flexible display screen and is connected to the main board; wherein when the display device is in use, the entire flexible display screen is stretched to the exterior of the housing body.

Furthermore, the display device includes: a first connector disposed on the main board; and a second connector disposed on the flexible circuit board and electrically connected to the first connector.

Furthermore, the display device includes: a changeover flexible circuit board, wherein the changeover flexible circuit board surrounds the first shaft and is disposed between the outer surface of the first roller and an inner surface of the flexible display screen, an end of the changeover flexible circuit board is connected to the main board, and another end of the changeover flexible circuit board is connected to the flexible circuit board.

Furthermore, the first roller includes: a main body of the first roller, wherein the main body of the first roller is a cylinder; and an opening of the first roller, wherein the opening of the first roller is defined on a sidewall of the main body of the first roller; wherein the main board is disposed in the main body of the first roller and corresponds to the opening of the first roller; and the flexible circuit board is disposed at the opening of the first roller and is attached to the main board.

Furthermore, the first roller further includes: a filling substance, wherein the filling substance is attached to a surface of the flexible circuit board and fills the opening of the first roller; wherein an outer surface of the filling substance and an outer sidewall of the main body of the first roller is disposed at a same curved surface.

Furthermore, a sidewall of the housing body is provided with an opening of the housing body, and the flexible display screen passes through the opening of the housing body.

Furthermore, the display device includes: a second shaft, wherein the second shaft is rotatably mounted at two opposite inner sidewalls of the housing body, and a central axis of the second shaft is parallel to a central axis of the first shaft; and a second roller, wherein the second roller is sleeved on an exterior of the second shaft and is firmly connected to the second shaft; wherein when the flexible display screen is rolled up, the flexible display screen is tangent to an outer surface of the second roller.

Furthermore, the central axis of the first shaft is parallel to a sidewall, which is provided with an opening of the housing body, of the housing body; and a distance between the sidewall, which is provided with the opening of the housing body, of the housing body and the central axis of the second shaft is greater than a distance between the sidewall, which is provided with the opening of the housing body, of the housing body and the central axis of the first shaft; or the distance between the sidewall, which is provided with the opening of the housing body, of the housing body and the central axis of the second shaft is less than the distance between the sidewall, which is provided with the opening of the housing body, of the housing body and the central axis of the first shaft.

Furthermore, the display device includes: a back board, wherein the back board is spirally sleeved on an outer surface of the second roller; when the display device is in use, the flexible display screen is disposed on the back board.

Furthermore, the display device includes: a fixing board, wherein the fixing board is mounted at the first roller and is connected to an end of the flexible display screen.

Regarding the beneficial effects: the present disclosure relates to a display device. When the display device is in use, a flexible screen is completely stretched to an exterior of a housing body. When the display device is idle, the flexible display screen is rolled up to be spirally sleeved on a first roller. Therefore, a size of the display device can be reduced, and portability of the display device can be improved.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DESCRIPTION OF SPECIFIC EMBODIMENTS OF THE INVENTION

Preferred embodiments of the present disclosure are illustrated below with reference to accompanying drawings to prove that the present disclosure can be implemented. The embodiments are used to fully describe technical solutions of the present disclosure so that those skilled in the art may clearly and easily understand the technical solutions. The present disclosure may be realized by many different types of embodiments; therefore, the scope of protection of the present disclosure is not limited to the embodiments mentioned in the specification.

It should be understood that terms such as "upper", "lower", "front", "rear", "left", "right", "inside", "outside," "lateral", as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure.

The identical or similar reference numerals constantly denote the identical or similar elements or elements having the identical or similar functions. In addition, for the sake of better understanding and description, the size and thickness of each component shown in the drawings are arbitrarily shown, but the present disclosure is not limited thereto.

It should be noted that a structure in which a first feature is "on" a second feature may include an embodiment in which the first feature directly contacts the second feature and may also include an embodiment in which an additional feature is formed between the first feature and the second feature. It should be noted that a structure in which a first feature is "mounted on" or "connected to" a second feature may include an embodiment in which the first feature is directly mounted on or connected to the second feature and may also include an embodiment in which the first feature is mounted on or connected to the second feature by an additional feature.

First Embodiment

Figure 1:
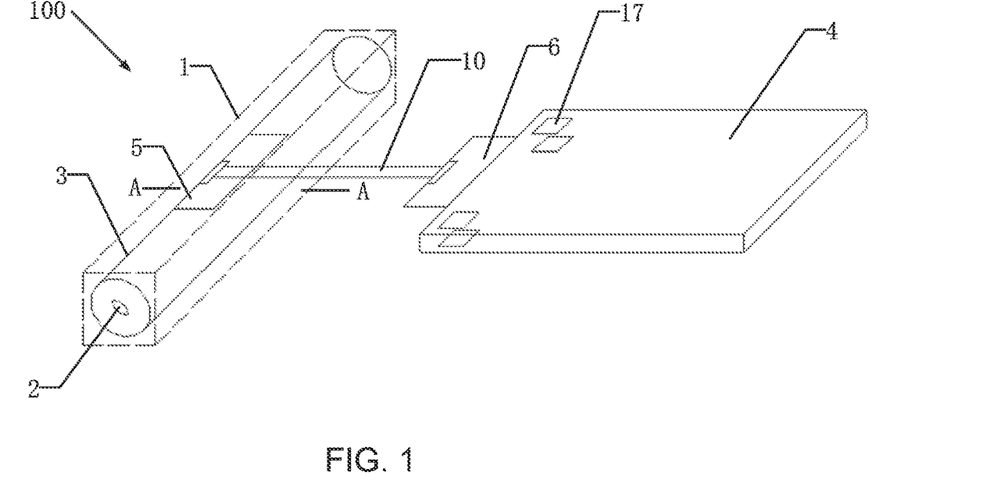
FIG. 1 is a structural schematic view showing a display device according to a first embodiment.
Figure 2:
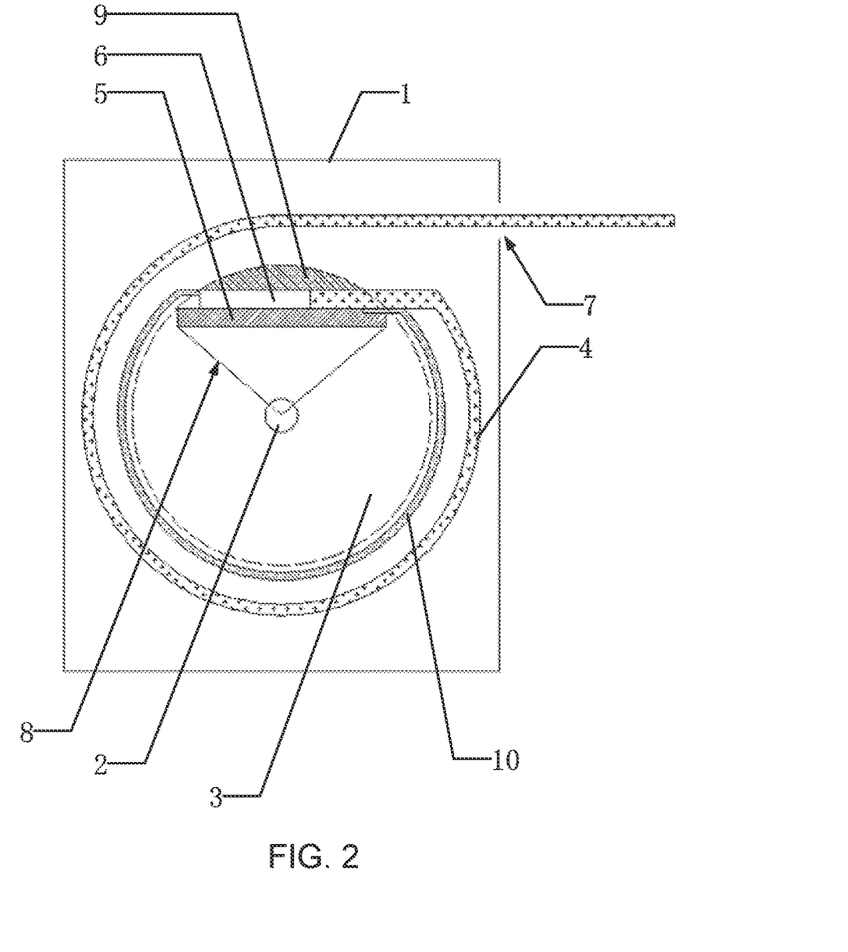
FIG. 2 a sectional view showing the display device according to the first embodiment taken along line A-A.

As shown in FIG. 1 and FIG. 2, the present embodiment provides a display device 100, including: a housing body 1, a first shaft 2, a first roller 3, a flexible display screen 4, a main board 5, and a flexible circuit board 6.

As shown in FIG. 1 and FIG. 2, a sidewall of the housing body 1 is provided with an opening 7 of the housing body, and the flexible display screen 4 passes through the opening 7 of the housing body.

As shown in FIG. 1 and FIG. 2, the first shaft 2 is rotatably mounted at two opposite inner sidewalls of the housing body 1. When the flexible display screen 4 is stretched or rolled up, the first shaft 2 can be freely rotated with respect to the housing body 1.

As shown in FIG. 1 and FIG. 2, the first roller 3 is sleeved on an exterior of the first shaft 2 and is firmly connected to the first shaft 2. That is, the first roller 3 is attached to the first shaft 2, so that the first shaft 2 can drive the first roller 3 to rotate, thereby stretching or rolling up the flexible display screen 4.

Figure 3:
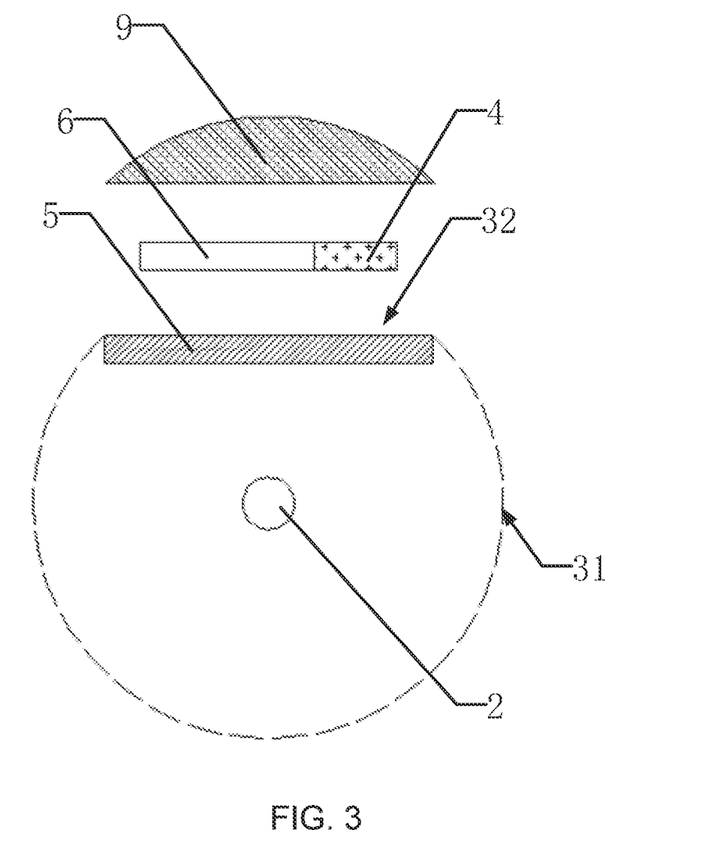
FIG. 3 is a structural schematic view showing a first roller of the display device.

As shown in FIG. 3, the first roller 3 includes a main body 31 of the first roller and an opening 32 of the first roller. The main body 31 of the first roller is a cylinder, and the opening 32 of the first roller is defined at a sidewall of the main body 31 of the first roller.

As shown in FIGS. 1 to 3, the main board 5 is disposed in the main body 31 of the first roller and corresponds to the opening 32 of the first roller. The main board 5 is fixed in the first roller 3. In the present embodiment, the main board 5 is fixed at the first shaft 2 by a support 8. Because the first shaft 2 and the first roller 3 are fixed to each other, the first shaft 2, the first roller 3, and the main board 5 are fixed to each other.

As shown in FIGS. 1 to 3, the flexible circuit board 6 is disposed at the opening 32 of the first roller and is attached to the main board 5. Specifically, the flexible circuit board 6 may be attached to the main board 5 by an adhesive.

As shown in FIGS. 1 to 3, the flexible display screen 4 is spirally sleeved on an outer surface of the first roller 3, an end of the flexible display screen 4 is connected to the first roller 3, and another end of the flexible display screen 4 extends to an exterior of the housing body 1. Specifically, an end of the flexible display screen 4 is connected to flexible circuit board 6 by an adhesive, and the another end of the flexible display screen 4 passes through the opening 7 of the housing body and extends to the exterior of the housing body 1. When the display device 100 is in use, the flexible display screen 4 is completely stretched to the exterior of the housing body 1.

As shown in FIG. 2 and FIG. 3, the first roller 3 further includes a filling substance 9 attached to a surface of the flexible circuit board 6 and filling the opening 32 of the first roller. An outer surface of the filling substance 9 and an outer sidewall of the main body 31 of the first roller is at a same curved surface. Due to the filling substance 9, an outer surface of the first roller 3 may be a complete curved surface. Therefore, when the flexible display screen 4 is rolled up, it can be well sleeved on the outer surface of the first roller 3.

As shown in FIG. 1, the display device 100 further includes a changeover flexible circuit board 10 surrounding the first shaft 2 and disposed between the outer surface of the first roller 3 and an inner surface of the flexible display screen 4. An end of the changeover flexible circuit board 10 is connected to the main board 5, and another end of the changeover flexible circuit board 10 is connected to the flexible circuit board 6. Thus, the flexible circuit board 6 and the main board 5 are electrically connected to each other.

As shown in FIG. 1 and FIG. 2, the display device 100 further includes a reinforcing element 17 disposed on a surface of the flexible display screen 4 contacting the main board 5. The reinforcing element 17 is mainly configured to distribute applied forces generated when the display device 100 is in use, thereby firmly connecting the flexible display screen 4 to the main board 5 and preventing them from being separated.

When the flexible display screen 4 is unfolded, the first roller 3 clockwise rotates, and when the flexible display screen 4 is rolled up, the first roller 3 counterclockwise rotates. Alternatively, when the flexible display screen 4 is unfolded, the first roller 3 counterclockwise rotates, and when the flexible display screen 4 is rolled up, the first roller 3 clockwise rotates.

As shown in FIG. 1 and FIG. 2, in the present embodiment, when the flexible display screen 4 is unfolded, the first roller 3 clockwise rotates, and when the flexible display screen 4 is rolled up, the first roller 3 counterclockwise rotates.

In summary, when the display device 100 is in use, the flexible screen 4 is completely stretched to the exterior of the housing body 1. When the display device 100 is idle, the flexible display screen 4 is rolled up to be spirally sleeved on the first roller 3. Therefore, a size of the display device 100 can be reduced, and portability of the display device 100 can be improved.

Second Embodiment

Figure 4:
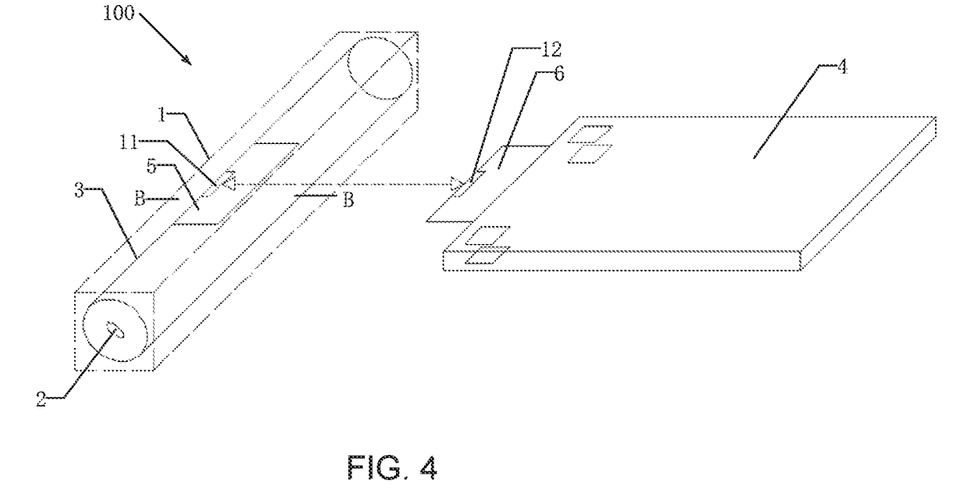
FIG. 4 is a structural schematic view showing a display device according to a second embodiment.
Figure 5:
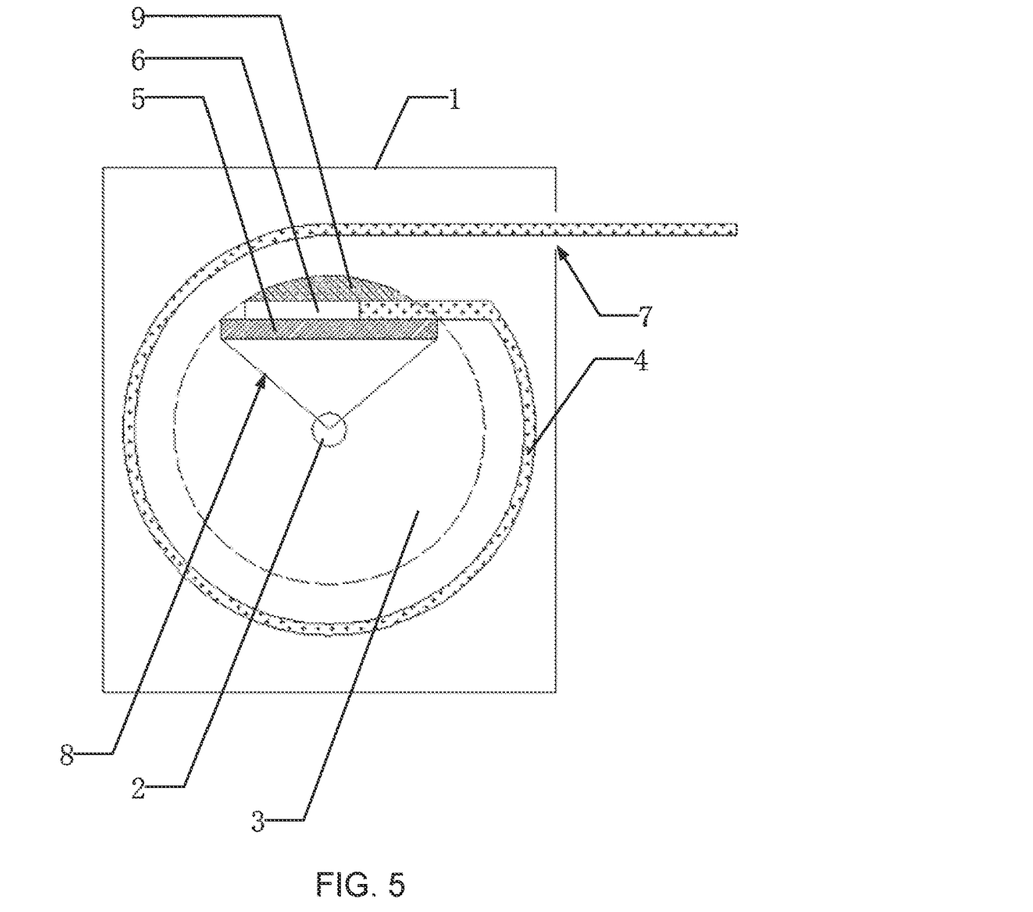
FIG. 5 is a sectional view showing the display device according to the second embodiment taken along line B-B.

As shown in FIG. 4 and FIG. 5, the present embodiment includes most characteristics of the first embodiment. A difference between the present embodiment and the first embodiment is: in the present embodiment, the flexible circuit board 6 is electrically connected to the main board 5 by a first connector 11 and a second connector instead of the changeover flexible circuit board 10 of the first embodiment.

As shown in FIG. 4, the display device 100 further includes the first connector 11 and the second connector 12. The first connector 11 is disposed on the main board 5, and the second connector 12 is disposed on the flexible circuit board 6 and is electrically connected to the first connector 11.

In summary, when the display device 100 is in use, the flexible screen 4 is completely stretched to the exterior of the housing body 1. When the display device 100 is idle, the flexible display screen 4 is rolled up to be spirally sleeved on the first roller 3. Therefore, a size of the display device 100 can be reduced, so that portability of the display device 100 can be improved.

Third Embodiment

Figure 6:
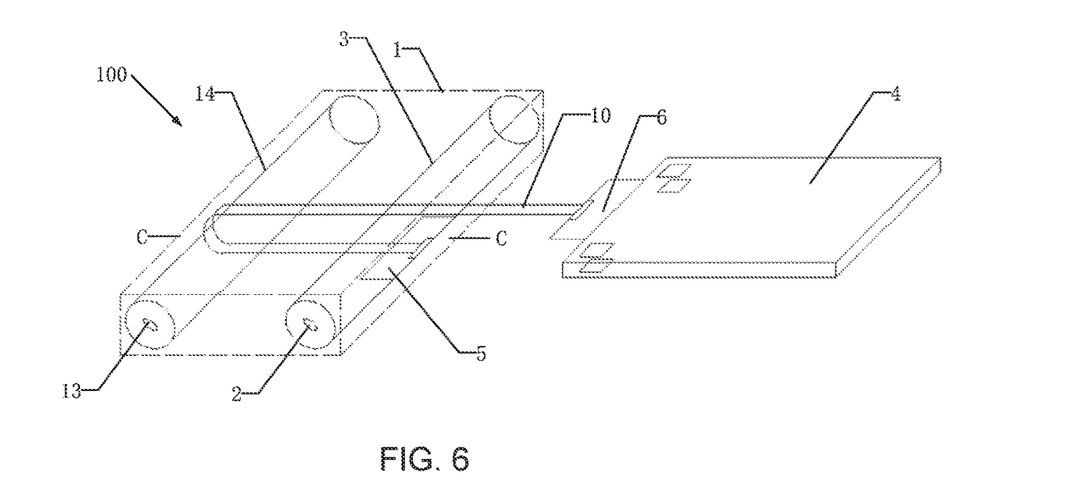
FIG. 6 is a structural schematic view showing a display device according to a third embodiment.
Figure 7:
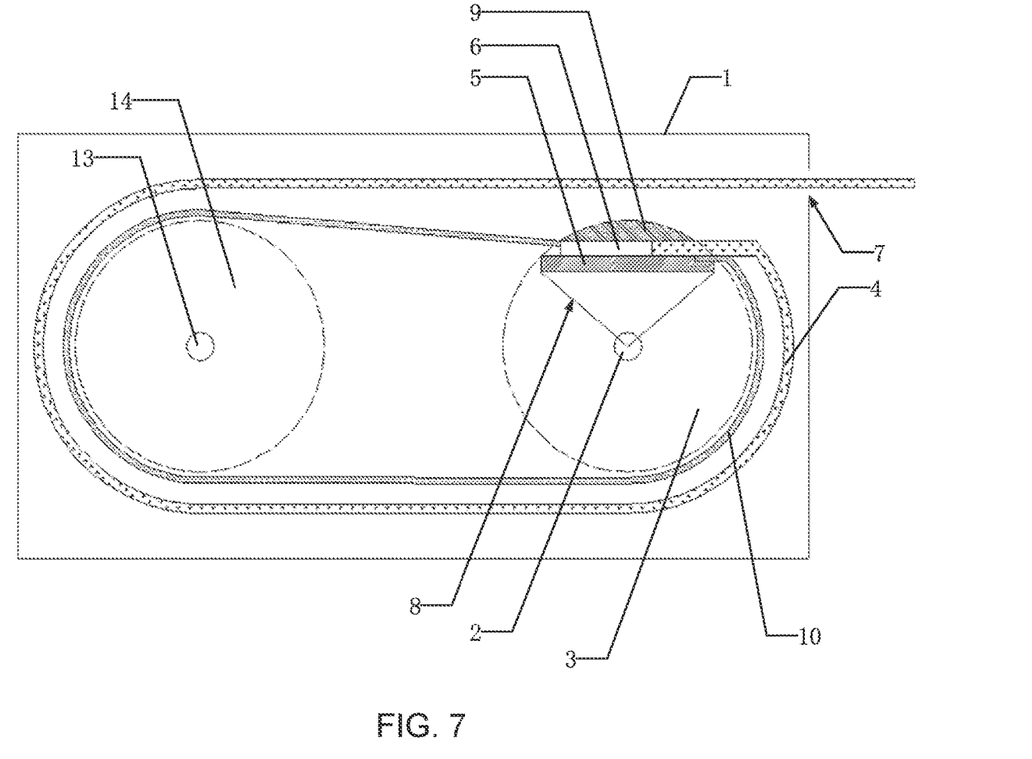
FIG. 7 is a sectional view showing a display device according to the third embodiment taken along line C-C.

As shown in FIG. 6 and FIG. 7, the present embodiment includes all of the characteristics of the first embodiment. In the present embodiment, the display device 100 further includes: a second shaft 13 and a second roller 14.

The second shaft 13 is rotatably mounted at two opposite inner sidewalls of the housing body 1, and a central axis of the second shaft 13 is parallel to a central axis of the first shaft 2. The second roller 14 is sleeved on an exterior of the second shaft and is firmly connected to the second shaft 13. When the flexible display screen 4 is stretched or rolled up, the first shaft 2 and the second shaft 13 may respectively drive the first roller 3 and the second roller 14 to rotate. That is, the first shaft 2, the second shaft 13, the first roller 3, and the second roller 14 may simultaneously clockwise or counterclockwise rotate, and a rotation rate of the first roller 3 and that of the second roller 14 are same.

As shown in FIG. 6 and FIG. 7, the central axis of the first shaft 2 is parallel to a sidewall, which is provided with the opening 7 of the housing body, of the housing body, and a distance between the sidewall, which is provided with the opening 7 of the housing body, of the housing body and a central axis of the second shaft 13 is greater than the distance between the sidewall, which is provided with the opening 7 of the housing body, of the housing body and the central axis of the first shaft 2. The distance between the central axis of the second shaft 13 and the sidewall, which is provided with the opening 7 of the housing body, of the housing body is greater than a—distance between the central axis of the first shaft 2 and the sidewall, which is provided with the opening 7 of the housing body, of the housing body.

As shown in FIG. 7, when the flexible display screen 4 is rolled up, the flexible display screen 4 is tangent to an outer surface of the second roller 14. Specifically, the flexible display screen 4 may be rotatably sleeved on the outer surface of the first roller 3. An end of the flexible display screen 4 is connected to the flexible circuit board 6, another end of the flexible display screen 4 extends to and surrounds the second roller 13, is attached to a curved surface of the second roller 14 away from the first roller 3, and finally passes through the opening 7 of the housing body and extends to the exterior of the housing body 1.

In summary, when the display device 100 is in use, the flexible screen 4 is completely stretched to the exterior of the housing body 1. When the display device 100 is idle, the flexible display screen 4 is rolled up to be spirally sleeved on the first roller 3. Therefore, a size of the display device 100 can be reduced, so that portability of the display device 100 can be improved.

Fourth Embodiment

Figure 8:
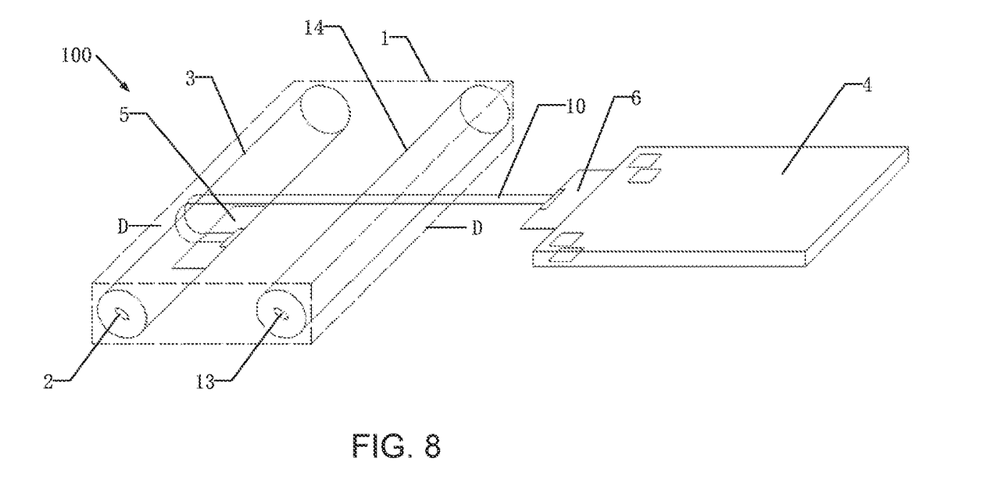
FIG. 8 is a structural schematic view showing a display device according to a fourth embodiment.
Figure 9:
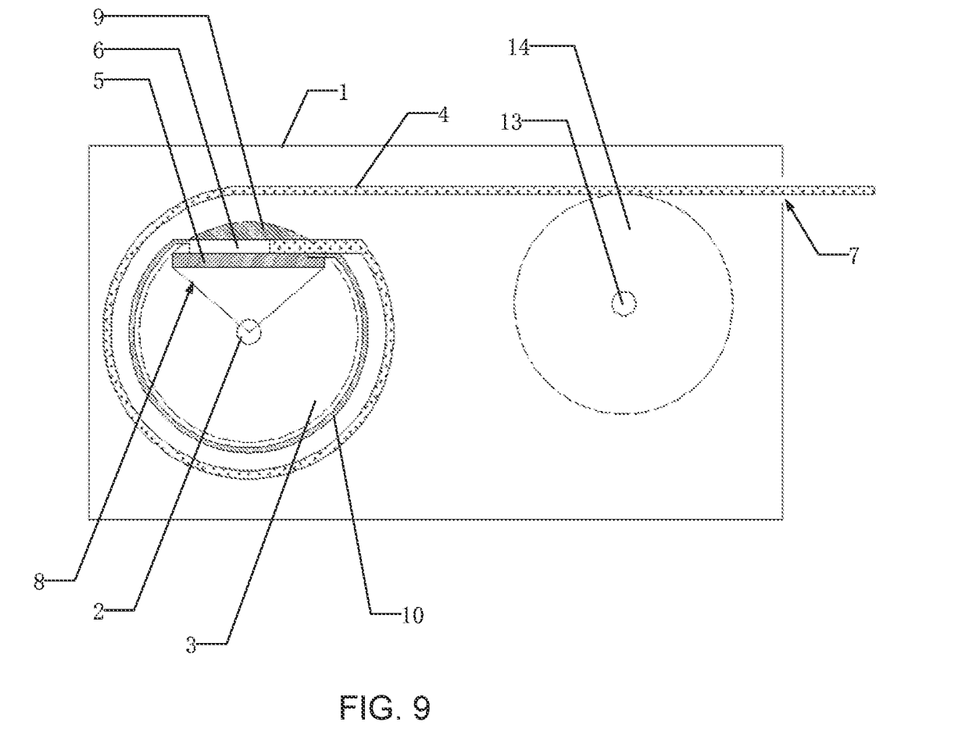
FIG. 9 is a sectional view showing the display device according to the fourth embodiment taken along line D-D.

As shown in FIG. 8 and FIG. 9, the present embodiment includes most characteristics of the third embodiment, and a difference between the present embodiment and the third embodiment is: in the present embodiment, the distance between the sidewall, which is provided with the opening 7 of the housing body, of the housing body and a central axis of the second shaft 13 is less than the distance between the sidewall, which is provided with the opening 7 of the housing body, of the housing body and the central axis of the first shaft 2. The distance between the central axis of the second shaft 13 and the sidewall, which is provided with the opening 7 of the housing body, of the housing body is less than the distance between the central axis of the first shaft 2 and the sidewall, which is provided with the opening 7 of the housing body, of the housing body.

As shown in FIG. 9, when the flexible display screen 4 is rolled up, the flexible display screen 4 is tangent to the outer surface of the second roller 14. Specifically, the flexible display screen 4 may be rotatably sleeved on the outer surface of the first roller 3. An end of the flexible display screen 4 is connected to the flexible circuit board 6, another end of the flexible display screen 4 is tangent to the outer surface of the second roller 14, passes through the opening 7 of the housing body, and extends to the exterior of the housing body 1. The second roller 14 can control a position of the flexible display screen 4, thereby preventing warpage of the flexible display screen 4 in the housing body 1, and reducing a number of bending times of the flexible display screen 4 in the housing body 1.

In summary, when the display device 100 is in use, the flexible screen 4 is completely stretched to the exterior of the housing body 1. When the display device 100 is idle, the flexible display screen 4 is rolled up to be spirally sleeved on the first roller 3. Therefore, a size of the display device 100 can be reduced, so that portability of the display device 100 can be improved.

Fifth Embodiment

Figure 10:
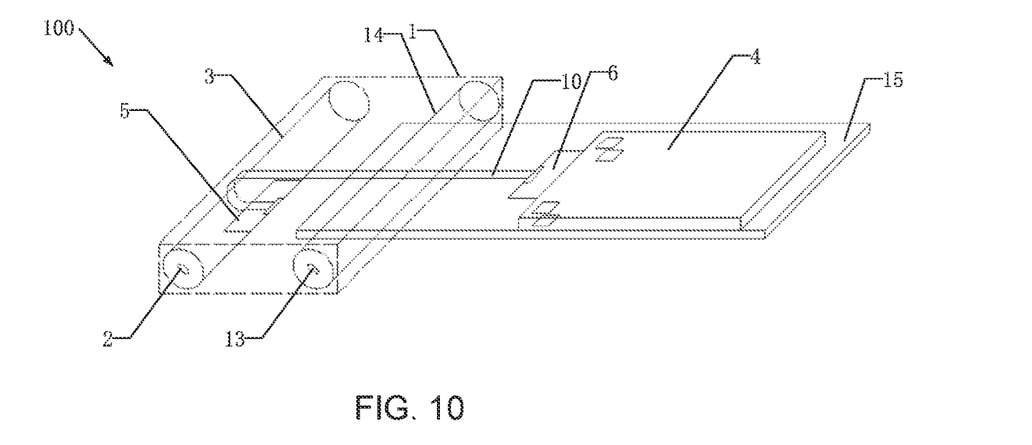
FIG. 10 is a structural schematic view showing a display device according to a fifth embodiment.

As shown in FIG. 10, the present embodiment includes all of the characteristics of the fourth embodiment. In the present embodiment, the display device 100 further includes a back board 15.

As shown in FIG. 10, the back board 15 is spirally sleeved on the outer surface of the second roller 14. When the display device 100 is in use, the flexible display screen 4 is disposed on the back board 15. The back board 15 can improve flatness of the unfolded flexible display screen 4. Furthermore, the back board 15 can also protect the flexible display screen 4, enhancing stability of the entire display device 100.

In summary, when the display device 100 is in use, the flexible screen 4 is completely stretched to the exterior of the housing body 1. When the display device 100 is idle, the flexible display screen 4 is rolled up to be spirally sleeved on the first roller 3. Therefore, a size of the display device 100 can be reduced, so that portability of the display device 100 can be improved.

Sixth Embodiment

Figure 11:
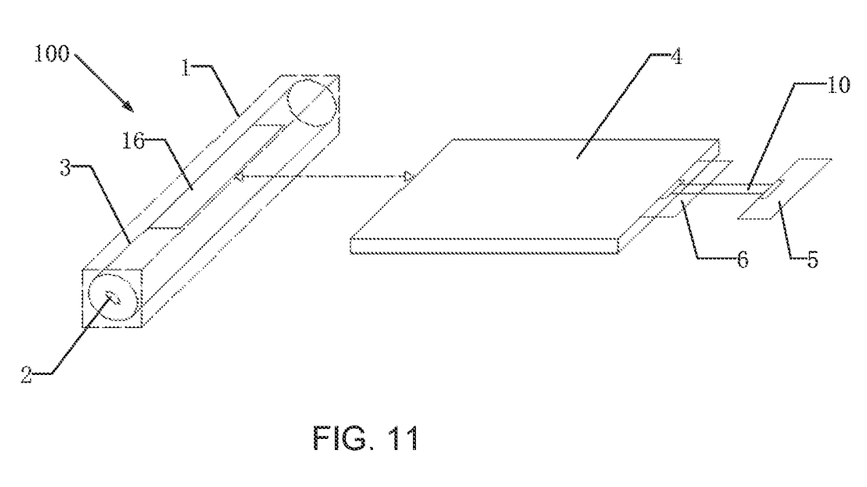
FIG. 11 is a structural schematic view showing a display device according to a sixth embodiment.

As shown in FIG. 11, the present embodiment includes most of the characteristics of the first embodiment, and a difference between the present embodiment and the first embodiment is: in the present embodiment, the main board 5 is disposed on the exterior of the housing body instead of the interior of the main body of the first roller.

As shown in FIG. 11, the display device 100 further includes a fixing board 16 mounted at the first roller 3 and connected to an end of the flexible display screen 4. Specifically, the fixing board 16 may be mounted at the first roller 3 by a support.

As shown in FIG. 9, the flexible display screen 4 is spirally sleeved on the first roller 3, an end of the flexible display screen 4 is fixed at the fixing board, and another end of the flexible display screen is connected to the flexible circuit board 6. The flexible circuit board 6 is attached to the main board 5.

In summary, when the display device 100 is in use, the flexible screen 4 is completely stretched to the exterior of the housing body 1. When the display device 100 is idle, the flexible display screen 4 is rolled up to be sleeved on the first roller 3. Therefore, a size of the display device 100 can be reduced, so that portability of the display device 100 can be improved.

The display device has been described in detail with embodiments provided by the present disclosure which illustrates principles and implementations thereof. However, the description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A display device, comprising:
a housing body;
a first shaft, wherein the first shaft is rotatably mounted at two opposite inner sidewalls of the housing body;
a first roller, wherein the first roller is sleeved on an exterior of the first shaft and is firmly connected to the first shaft;
a flexible display screen, wherein the flexible display screen is spirally sleeved on an outer surface of the first roller, an end of the flexible display screen is connected to the first roller, and another end of the flexible display screen is near an exterior of the housing body;
a main board, wherein the main board is attached to an interior of the first roller or the exterior of the housing body; and
a flexible circuit board, wherein the flexible circuit board is connected to the end of the flexible display screen and is connected to the main board;
a second shaft, wherein the second shaft is rotatably mounted at two opposite inner sidewalls of the housing body, and a central axis of the second shaft is parallel to a central axis of the first shaft; and
a second roller, wherein the second roller is sleeved on an exterior of the second shaft and is firmly connected to the second shaft;
a changeover flexible circuit board, wherein the changeover flexible circuit board surrounds the first shaft and is disposed between the outer surface of the first roller and an inner surface of the flexible display screen, an end of the changeover flexible circuit board is connected to the main board, and another end of the changeover flexible circuit board is connected to the flexible circuit board, and the changeover flexible circuit board surrounds the first roller and the second roller such that the first roller and the second roller contact and guide the changeover flexible circuit board to extend or retract with the flexible display screen;
wherein when the flexible display screen is rolled up, the flexible display screen is tangent to an outer surface of the second roller;
wherein when the display device is in use, the entire flexible display screen is stretched to the exterior of the housing body.

2. The display device of claim 1, further comprising:
a first connector disposed on the main board; and
a second connector disposed on the flexible circuit board and electrically connected to the first connector.

3. The display device of claim 1, wherein the first roller comprises:
a main body of the first roller, wherein the main body of the first roller is a cylinder; and
an opening of the first roller, wherein the opening of the first roller is defined on a sidewall of the main body of the first roller;

wherein the main board is disposed in the main body of the first roller and corresponds to the opening of the first roller; and the flexible circuit board is disposed at the opening of the first roller and is attached to the main board.

4. The display device of claim 3, wherein the first roller further comprises:

a filling substance, wherein the filling substance is attached to a surface of the flexible circuit board and fills the opening of the first roller;

wherein an outer surface of the filling substance and an outer sidewall of the main body of the first roller is disposed at a same curved surface.

5. The display device of claim 1, wherein a sidewall of the housing body is provided with an opening of the housing body, and the flexible display screen passes through the opening of the housing body.

6. The display device of claim 1, wherein the central axis of the first shaft is parallel to a sidewall of the housing body provided with an opening of the housing body; and a distance between the sidewall of the housing body provided with the opening of the housing body and the central axis of the second shaft is greater than a distance between the sidewall of the housing body provided with the opening of the housing body and the central axis of the first shaft; or the distance between the sidewall of the housing body provided with the opening of the housing body and the central axis of the second shaft is less than the distance between the sidewall of the housing body provided with the opening of the housing body and the central axis of the first shaft.

7. The display device of claim 6, further comprising:

a back board, wherein the back board is spirally sleeved on the outer surface of the second roller;

wherein when the display device is in use, the flexible display screen is disposed on the back board.

8. The display device of claim 1, further comprising:

a fixing board, wherein the fixing board is mounted at the first roller and is connected to the end of the flexible display screen.

\* \* \* \* \*